(No Model.) 2 Sheets—Sheet 1.
R. P. SCOTT & J. A. CHISHOLM.
PEA HULLER.
No. 399,702. Patented Mar. 19, 1889.
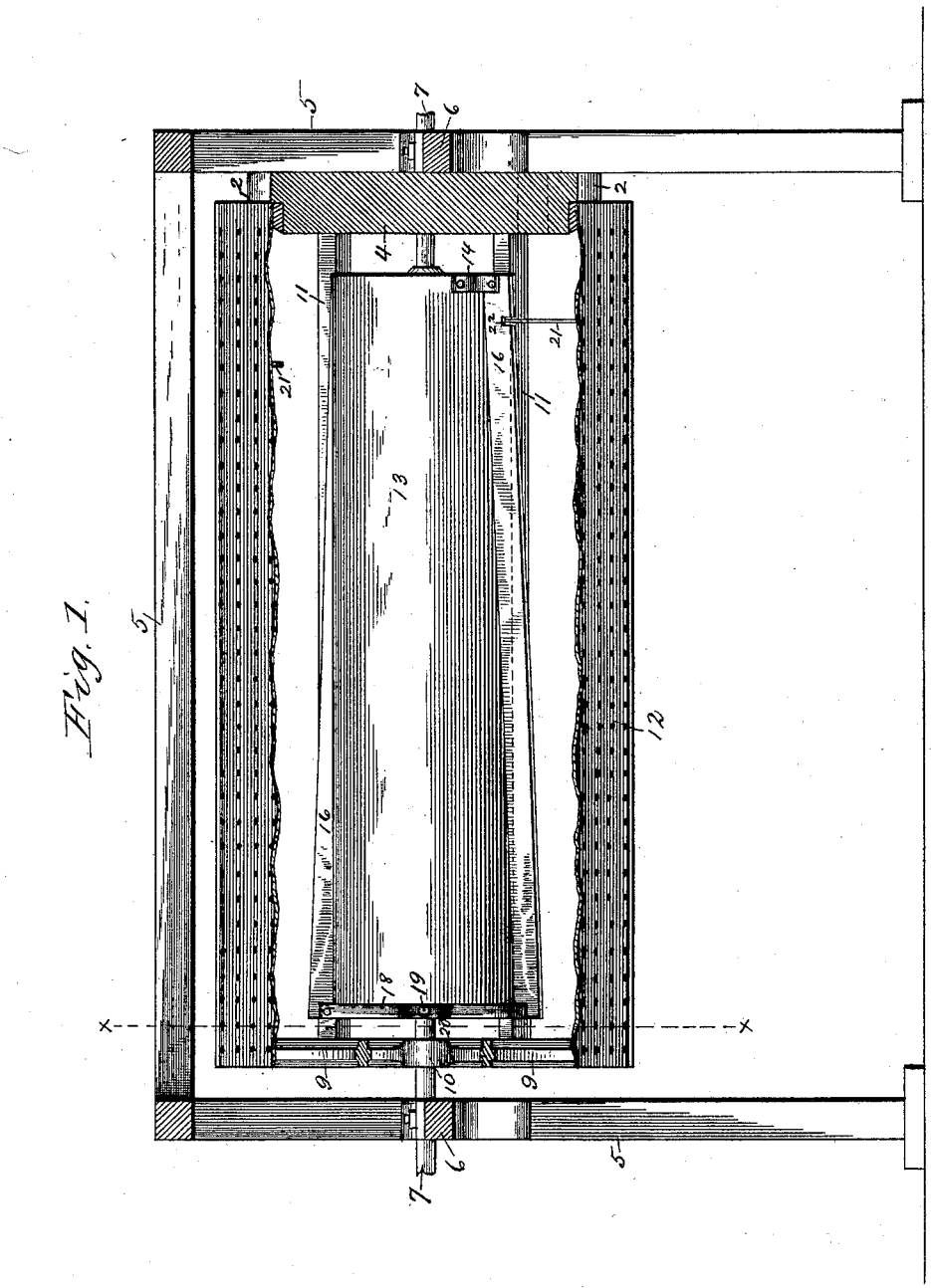
Witnesses
H. S. Rolues
T. R. Stuart
Inventors;
Robert P. Scott,
John A. Chisholm
By Marble + Mason,
Attorneys.

(No Model.) 2 Sheets—Sheet 2.
R. P. SCOTT & J. A. CHISHOLM.
PEA HULLER.
No. 399,702. Patented Mar. 19, 1889.
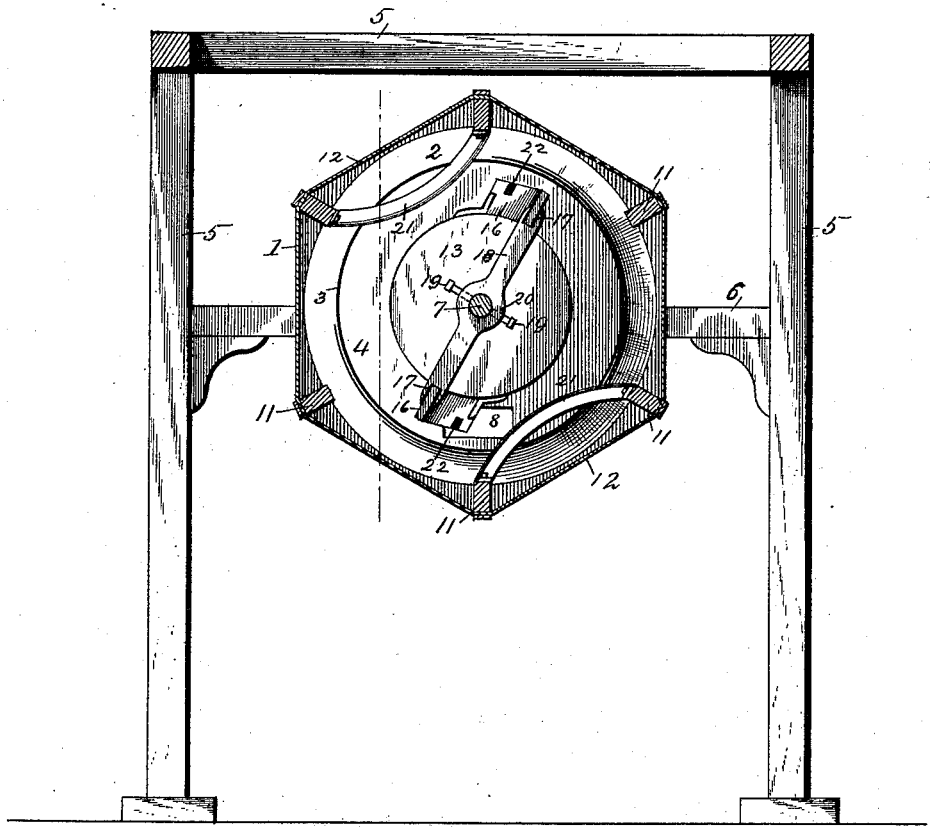
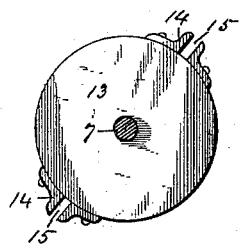

UNITED STATES PATENT OFFICE.

ROBERT P. SCOTT, OF BALTIMORE, MARYLAND, AND JOHN A. CHISHOLM, OF OAKVILLE, ONTARIO, CANADA.

PEA-HULLER.

SPECIFICATION forming part of Letters Patent No. 399,702, dated March 19, 1889.

Application filed October 10, 1888. Serial No. 287,748. (No model.)

*To all whom it may concern:*

Be it known that we, ROBERT P. SCOTT, a citizen of the United States, and JOHN A. CHISHOLM, a citizen of the Dominion of Canada, residing, respectively, at Baltimore, in the State of Maryland, and Oakville, county of Halton, Ontario, Canada, have invented certain new and useful Improvements in Pea-Hullers; and we do hereby declare the following to be a full, clear, and exact description of the invention, such as will enable others skilled in the art to which it appertains to make and use the same.

Our invention relates to machines for hulling and separating green peas from their pods, and contemplates certain improvements upon the machine for which Letters Patent were granted to Robert P. Scott August 7, 1888, No. 387,318, whereby under our present improvements the vines and their attached pods of peas can be fed into the machine, the peas hulled or released from said pods, and the vines and open pods carried along and delivered at the discharge end of the machine; and it consists in the improved construction and arrangement or combination of parts, hereinafter fully disclosed in the description, drawings, and claims.

The objects of our invention are, first, to provide means for hulling green peas from their pods without first removing said pods from the vines, so as to dispense with the time, labor, and expense incident to the old method of first picking the pods from their vines and then feeding them into the machine for being hulled or opened; second, to provide improved means for feeding the vines and pods through the separating-cylinder, for preventing said vines from becoming twisted or entangled with the beaters of the hulling-drum, and for adjusting the amount or rate of feed of the vines and pods through said separating-cylinder, and, third, to provide means for cutting the vines within the separating-cylinder, so as to prevent them from becoming bunched or clogged therein and prepare them in suitable lengths for the pods thereon to be readily hulled or opened. These objects we attain by the mechanism illustrated in the accompanying drawings, which form part of this specification, in which the same reference-numerals indicate the same parts, and in which—

Figure 1 represents a longitudinal vertical section of our machine for hulling and separating green peas upon the vines, said section being taken on a line forward of the hulling-drum; Fig. 2, a transverse vertical section on the line $x\,x$ of Fig. 1, looking toward the feed end of the machine; and Fig. 3, a view of the feed or front end of the hulling-drum.

In the drawings, the numeral 1 indicates the prismatic separating-cylinder, which is constructed in substantially the same manner as the cylinder shown and described in the above-mentioned patent, and provided at its feed end with an annular rim or flange, 2, which is formed with a large circular central opening, 3, within which a circular stationary head or disk, 4, fits, and upon which said rim or flange turns. This head or disk 4 is rigidly secured to the frame 5 of the machine, which is provided with a central bearing, 6, for the drum-shaft 7; also, said disk is formed with a suitable feed-opening, 8. The other or discharge end of the cylinder is provided with radial arms 9, having a central hub or bearing, 10, for said drum-shaft.

The longitudinal bars or ribs 11 of the separating-cylinder are secured at their ends to the ends of said cylinder and have a perforated covering, 12, of japanned leather, or so-called "patent-leather," stretched over and secured to them, said covering extending in this machine from one end of the cylinder to the other; or, if preferred, this covering may extend nearly to the discharge end of said cylinder, the remaining portion being covered with a larger-meshed fabric, as disclosed in the patent above named.

The drum-shaft 7 and the separating-cylinder may be revolved by any suitable means—such, for instance, as the pulley-and-belt gearing shown and described in the above-mentioned patent.

A cylindrical drum, 13, is rigidly secured upon the shaft 7 and provided at its front or feed end with two brackets, 14, which are formed with vertical slots 15, within which are secured by bolts the ends of two oppositely-arranged impact openers or beaters, 16.

These impact openers or beaters are formed of flat bars loosely mounted upon the periphery of said drum, the rear ends of which are secured by bolts in the radial slots 17, which are formed in the ends of a transverse bar, 18, which is secured upon the shaft 7 at the rear end of the hulling-drum by means of set-screws 19. These screws pass through a central enlargement, 20, formed upon said bar and bear adjustably against the shaft, in order that the impact openers or beaters may be adjusted slightly oblique to the axis of or spirally upon the periphery of said hulling-drum. These beaters rest loosely upon the periphery of this drum.

Near the feed end of the separating-chamber are secured knives 21, which are preferably curved, although not necessarily so. These knives are preferably attached to adjacent pairs of the longitudinal bars or ribs 11 on opposite sides of said cylinder; also, the impact openers or beaters 16 are formed with recesses or notches 22, which register with said knives and permit of their passage therethrough.

If desired, a greater number of knives may be secured in the cylinder at different points along the same, when the beaters will be formed with corresponding recesses or notches. I prefer to arrange these knives one in advance of the other along the separating-cylinder, so that long vines and such as may escape being cut by the first knife will be severed on reaching the second.

It is to be understood, of course, that suitable devices for feeding the vines and pods into the separating-cylinder and for carrying away said vines and the open pods and separating them from the hulled peas are to be employed in connection with the present improvements; but they form no part of the present invention.

The operation of our improved machine is as follows: The vines and the peas in the pods attached thereto are fed into the feed end of the separating-cylinder, which receives them between its longitudinal bars or ribs and carries them slowly upward until they are caught by the beaters of the more rapidly-revolving hulling-drum and carried over the edges of the curved knives, which cut them into suitable lengths for proper treatment within and passage through said cylinder. The relative speeds of the separating-cylinder and the hulling-drum are preferably about as fifteen is to one hundred and sixty. The beaters of the rapidly-revolving drum strike the pods on the vines with sufficient force to open them and release the peas, which then pass out through the perforations in the covering of the separating-cylinder. The beaters, as stated, are adjustable upon the periphery of the drum, so as to assume more or less obliquity or spirality by means of the slotted transverse bar, which, by loosening the set-screws, can be turned upon the drum-shaft, and thus said beaters made to assume more or less obliquity with respect to the periphery of the hulling-drum. It follows from the construction and arrangement of the parts just named that the vines and pods will be fed toward the open discharge end of the separating-cylinder with more or less rapidity, according to the degree of obliquity or spirality that is imparted to said beaters. The front ends of the flat bars composing the beaters have sufficient play within the vertically-slotted brackets to admit of their being adjusted by turning the transverse bar upon the drum-shaft, the rear ends of said beaters being also so mounted in the radial slots formed in the ends of said bar that they will admit of slight play therein, and yet be held firm or secure. The knives cut the vines into proper lengths to permit free action of the beaters thereon for opening the pods and to prevent said vines and pods from bunching or becoming clogged in the separating-chamber. While only two of these knives are shown in the drawings, which under ordinary circumstances will be sufficient, a larger number may be employed if necessary or desired. The vines are also prevented from becoming twisted or entangled with the impact openers or beaters, from the fact that their inner edges rest upon or close to the periphery of the hulling-drum, and thus said vines will be freely fed without obstruction from the feed end to the discharge end of the separating-cylinder.

Having thus fully described the construction and arrangement or combination of the several parts of our improved machine for hulling and separating green peas upon the vines, its operation, and advantages, what we claim as new therein is—

1. In a machine for hulling and separating green peas upon the vines, the combination, with a revolving perforated separating-cylinder having a feed-opening at one end and a discharge-opening at the other end, of a revolving hulling-drum which is arranged within said cylinder and provided with brackets at one end, a transverse adjustable bar arranged at its other end and formed with slotted ends, and impact openers or beaters having their ends secured in said brackets and said adjustable slotted bar and adapted to be variably adjusted obliquely to the axis of said drum and upon the periphery thereof, substantially as described.

2. In a machine for hulling and separating green peas upon the vines, the combination, with a revolving perforated separating-cylinder having a feed-opening at one end and a discharge-opening at the other end, of a revolving hulling-drum which is arranged within said cylinder and provided with slotted brackets at one end thereof, a transverse bar formed with slots in its ends and provided with set-screws for adjustably securing the same upon the drum-shaft at the other end of said hulling-drum, and flat impact openers or beaters arranged upon the periphery of said drum and having their ends secured in said slotted brackets and said adjustable slotted bar, substantially as described.

3. In a machine for hulling and separating green peas upon the vines, the combination of a revolving perforated separating-cylinder provided with one or more interiorly-arranged knives for cutting the vines, and a revolving hulling-drum arranged within said cylinder, substantially as described.

4. In a machine for hulling and separating green peas upon the vines, the combination of a revolving perforated separating-cylinder provided with one or more interiorly-arranged knives for cutting the vines, and a revolving hulling-drum arranged within said cylinder and provided with impact openers or beaters extending from end to end thereof, substantially as described.

5. In a machine for hulling and separating green peas upon the vines, the combination of a revolving perforated separating-cylinder provided with one or more interiorly-arranged knives for cutting the vines, and a revolving hulling-drum arranged within said cylinder and provided with adjustable impact openers or beaters upon its periphery, which are arranged slightly oblique to its axis, substantially as described.

6. In a machine for hulling and separating green peas upon the vines, the combination of a revolving perforated separating-cylinder provided with curved knives arranged upon opposite sides thereof, and a revolving hulling-drum arranged within said cylinder and provided with impact openers or beaters which are secured upon its periphery, arranged slightly oblique to its axis, and formed with notches which register with said curved knives, substantially as described.

7. In a machine for hulling and separating green peas upon the vines, the combination of a revolving perforated separating-cylinder provided with curved knives arranged upon opposite sides thereof near its feed end, one of said knives being arranged in advance of the other, and a revolving hulling-drum arranged within said cylinder and provided with impact openers or beaters which are secured upon its periphery, arranged slightly oblique to its axis, and formed with notches which register with said knives, substantially as described.

8. In a machine for hulling and separating green peas upon the vines, the combination of the revolving perforated prismatic cylinder having feed and discharge openings and the longitudinal bars or ribs 11, the curved knives 21, secured near the feed end to pairs of said longitudinal bars or ribs, and the revolving hulling-drum 13, provided with the impact openers or beaters 16, which are secured upon its periphery, arranged slightly oblique to its axis, and formed with the notches 22 for the passage of said knives 21, substantially as described.

In testimony whereof we affix our signatures in presence of two witnesses.

ROBERT P. SCOTT.
JOHN A. CHISHOLM.

Witnesses:
TOM R. STUART,
ROBINSON WHITE.